Aug. 12, 1969     D. CRYER     3,460,394

LIQUID DENSITY MEASURING METHOD AND APPARATUS

Filed June 5, 1967

INVENTOR.
DEL CRYER

BY Newton, Hopkins,
Jones & Ormsby
ATTORNEYS 3,460,394
LIQUID DENSITY MEASURING METHOD
AND APPARATUS
Del Cryer, 253 Wedgewood Drive,
Shreveport, La. 71105
Filed June 5, 1967, Ser. No. 643,647
Int. Cl. G01n 9/28
U.S. Cl. 73—439                                           3 Claims

ABSTRACT OF THE DISCLOSURE

Liquid density measuring method and apparatus wherein a pair of downwardly directed tubes of different lengths is inserted in a liquid and a gas is forced through the tubes and allowed to bubble up in the liquid. The difference in pressure of the gas of one tube in comparison to the gas of the other tube is measured to determine the density of the liquid. A gas pressure control apparatus is connected to the shorter tube so that the effective pressure of the gas flowing through the shorter tube can be varied.

BACKGROUND OF THE INVENTION

In some industries, the density of liquids is indicative of the effectiveness of the operation of the industry or the quality of the product produced. For instance, in various chemical industries, the density of the chemical being manufactured is indicative of its qualities. When the chemical substances reach an optimum density they may be ready for the next stage of preparation in a series of preparatory stages, or ready for sale. In other instances, liquids must be maintained within a specified range of densities in order to remain useful in their function. Such an instance is the drilling fluid, or mud as it is commonly called, in the drilling phase of the oil industry. The drilling fluid must be maintained within a range of densities in order for the drilling apparatus to function effectively. If the density of the drilling fluid drops due to entrained gas, and this condition is undetected, a "blowout" or expulsion of the drilling fluid may occur. On the other hand, if the drilling fluid density increases beyond the desirable range of densities, a loss of circulation of the drilling fluid will occur, thereby stopping the drilling action. Obviously, in either instance a shutdown of the drill results.

In order to maintain the density of various liquids at an optimum level, or within a specified range, various liquid density measuring apparatus have been developed. Generally, the measuring apparatus presently in use utilize either a submerged float or a side stream U-tube with flexible connections through which the drilling fluid flows. The liquid density is determined by measuring the buoyant force exerted on a submerged float or by weighing the suspended U-tube. Both of these systems depend upon a constant volume measuring element. This requirement constitutes a shortcoming in the measuring apparatus since the solids in the liquid build up on the exposed surface of the submerged float or on the interior walls of the tubes through which the liquid flows. When the buildup of solids occurs, the constant volume element no longer contains a constant volume of the liquid and error in the measurement of the liquid it does contain occurs.

In order to avoid the buildup of solids on the measuring apparatus, the double bubble tube technique has been utilized which constittues inserting tubes of different lengths downwardly into the liquid, forcing gas through the tubes into the liquid and allowing the gas to bubble up through the liquid, and measuring the difference in pressure of the gas in each tube. Since the two tubes are of different lengths, the pressure required to force the air from the bottom of the shorter tube is less than the pressure required to force the air from the longer tube, and the difference in the two pressures is a function of the density of the liquid and the difference in the lengths of the two tubes. Since the difference in the lengths of the two tubes is usually maintained constant, any variation in the differential pressure of the gases in the two tubes will be solely a function of the density of the liquid being tested. Even the depth at which the ends of the tubes are located has no effect on the differential pressure between the two tubes since the pressure being measured is the differential pressure between the gases of each tube. Thus, when the tubes are utilized in a stationary position in a liquid tank, the change in the liquid level in the tank will have no effect on the accuracy of the density measuring apparatus.

While the double bubble principle for measuring liquid density has met with some success in industry, the system has some shortcomings which are undesirable in certain applications. For instance, if the density measuring apparatus is utilized with a light liquid, a liquid with a low density, the pressure gauge utilized to measure and record the differential pressure of the gases within the tubes must be gauged so that the indicating needle travels over a substantial portion of the face of the gauge to indicate very slight variations in the differential pressure in order for the measuring apparatus to be effective. If the same measuring apparatus is utilized to record the density of a heavier liquid, a liquid having a high density, the indicating needle may pass completely beyond the face of the gauge since the differential pressure between the tubes, in comparison to the differential pressure of the lighter liquid, will be so great. Of course, the opposite of this condition will occur when a measuring apparatus only utilized with a heavy liquid is utilized with a lighter liquid. In this instance, the indicating needle would move only a very short distance across the face of the gauge.

SUMMARY OF THE INVENTION

This invention comprises a liquid density measuring method and apparatus which includes a pair of downwardly extending tubes of different lengths for insertion into the liquid of which the density is to be measured. Gas, such as air, is forced through the tubes and allowed to bubble up through the liquid. A differential pressure gauge is connected to the tubes and the pressure of the gas flowing through the tubes is compared. In order that the apparatus be utilized with liquids of varying densities, a zero suppressor is connected to the shorter of the tubes so that the effective pressure of the gas in the shorter tube can be varied, thus permitting the use of the single differential pressure gauge.

Thus, it is an object of this invention to provide a liquid density measuring method and apparatus for accurately measuring and recording the density of liquids, and of different liquids which vary in density.

Another object of this invention is to provide a double bubble liquid density measuring apparatus wherein the ends of the tubes utilized to force air through the liquid to be measured are maintained apart a constant vertical distance and the pressure of the gas flowing through the shorter tube can be varied.

Another object of this invention is to provide a double bubble liquid density measuring apparatus which utilizes a single differential pressure gauge to measure the density of different liquids.

Another object of this invention is to provide a liquid density measuring apparatus which is simple in construction, not affected by the solids of the liquid being measured, accurate, inexpensive, suitable for measuring any liquid, portable, and which has a wide range of measurements.

Other objects, features and advantages of the present invention will become apparent upon reading the following specification, when taken in conjunction with the accompanying drawing.

DESCRIPTION OF THE EMBODIMENTS

Figures 1, 2:
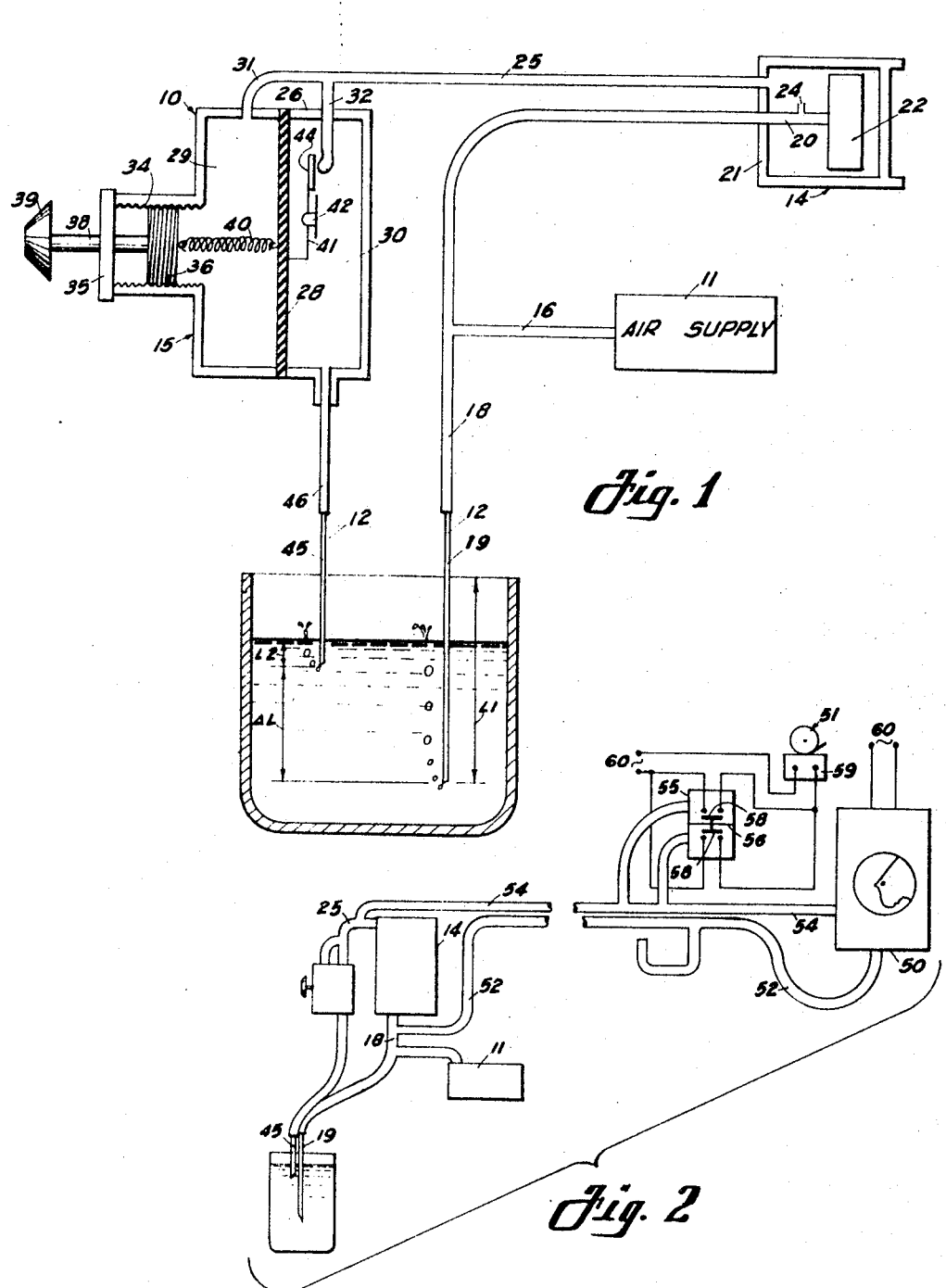
FIG. 1 is a shematic view of the liquid density measuring apparatus.
FIG. 2 is a schematic view of the liquid density measuring apparatus, similar to FIG. 1, but showing the use of a remotely situated recording and alarm apparatus.

Referring now more particularly to the drawing, in which like numerals indicate like parts throughout the several views, FIG. 1 shows the liquid density measuring apparatus 10 which includes an air supply 11, a pair of downwardly extending gas tubes 12, a differential pressure apparatus 14, and zero suppressor 15. Air supply 11 communicates with the various elements of the liquid density measuring apparatus through its delivery conduit 1. Delivery conduit 16 is connected in a T connection with conduit 18. Conduit 18 communicates at one of its ends with gas tube 19 which is the longer of the pair of tubes 12, and at its other end with differential pressure apparatus 14. The extension 20 of conduit 18 within the housing 21 of differential pressure apparatus 14 communicates with differential pressure gauge 22, and an opening 24 is defined in the extension 20, so as to allow a portion of the compressed air to escape from conduit 18 into housing 21. A pressure drop usuaally exists across opening 24.

Conduit 25 communicates at one of its ends with housing 21, and at the other of its ends with zero suppressor 15. Zero suppressor 15 includes housing 26 which is divided by flexible diaphragm 28 into first and second chambers 29 and 30, respectively. Branch conduit 31 communicates conduit 25 to first chamber 29, while branch conduit 32 communicates conduit 25 with second chamber 30.

First chamber 29 of housing 26 defines an internally threaded protrusion 34 which is closed by apertured cap 35. An externally threaded adjusting disc 36 is received in the threads of protrusion 34, and stem 38 of adjusting knob 39 extends through the aperture of cap 35 and is rigidly connected to adjusting disc 36. Thus, rotation of adjusting knob 39 causes a corresponding movement of adjusting disc 36, thereby causing adjusting disc 36 to move toward or away from diaphragm 28. Tension spring 40 is connected at one of its ends to adjusting disc 36 and at the other of its ends to the central portion of flexible diaphragm 28. Lever arm 41 is pivotally supported intermediate its ends in second chamber 30 by fulcrum 42. One end of lever arm 41 is connected to the central portion of flexible diaphragm 28, and the other end of lever arm 41 supports a valve disc 44. Valve disc 44 is arranged to seat on the opening of branch conduit 32 leading into second chamber 30, to block the flow of gas through branch conduit 32 into second chamber 30.

Gas tube 45, which is the shorter of the pair of gas tubes 12, is connected at its upper end with conduit 46, and conduit 46 communicates with second chamber 30.

As is shown in FIG. 2, secondary recording apparatus 50 and alarm 51 can be positioned at a remote point from the remaining elements of the liquid density measuring apparatus. Secondary recording apparatus communicates through conduits 52 and 54 with conduits 18 and 25, to receive and record the difference between the gas pressures in these conduits. Secondary recording apparatus, as well as differential pressure gauge 22, are of conventional construction and are commercially available. Alarm 51 is also of standard construction, and as is shown in FIG. 2, includes housing 55 divided by flexible diaphragm 56, the diaphragm 56 carrying contacts 58 which electrically connect alarm 59 to a source of electricity 60. With this construction, when diaphgram 56 detects a pressure differential between conduits 52 and 54 which is either too great or too small, alarm 59 will be energized.

Under the usual circumstances, differential pressure gauge 22 will be the needle type indicator while secondary recording apparatus 50 will be a graph recorder including a clock operated graph. With this arrangement, an easily read indication is available at the site of the liquid being measured, while a permanent record of the liquid density is maintained at the remote, more convenient location. While alarm 51 has been illustrated as being located adjacent the secondary recording apparatus at a point remote from the liquid being measured, the alarm may be located adjacent the liquid being measured, or two alarms may be utilized, one adjacent the liquid, and the other at a remote, more convenient location.

OPERATION

In a double bubble type liquid density measuring apparatus, the density of the liquid can be derived from the manometer equation, which is: $P = \rho_g L$, where P equals the pressure, $\rho$ equals the density of the liquid, $g$ equals acceleration of local gravity, and L equals the length of the tube. In applying the manometer equation to the instant invention, $P_1 - P_2$ is substituted for P in the manometer equation, $P_1 - P_2$ representing the difference in pressures of the gases in tubes 19 and 49. $L_1 - L_2$ is substituted for L in the manometer equation, $L_1 - L_2$ representing the difference in height between the ends of tubes 19 and 45. Thus, the manometer equation is modified as follows:

$$P_1 - P_2 = \rho_g (L_1 - L_2)$$

$$\Delta P = \rho_g \Delta L$$

Solving for $\rho$:

$$\rho = \Delta P / g \Delta L$$

Since $g$ and $\Delta L$ are constants, $$\rho \approx \Delta P$$

Thus, any change in the gas pressures present in tubes 19 and 49 is equivalent to a change in the density of the liquid being tested.

In utilizing a double bubble liquid density measuring apparatus without a zero suppressor, the differential pressure gauge utilized to measure the differences in pressure existing in tubes 19 and 45 must be capable of registering from a zero pressure difference up to a very high pressure difference when a high density liquid is being tested. Conversely, when a low density liquid is being tested, the pressure gauge would only have to cover a small differential range. In either instance, it is desirable to have the pressure indicating needle reflect a large change in position on the face of the gauge when the density of the liquid varies from its optimum density. In the instance where the density of a high density liquid is being measured, the gauge would necessarily be required to record from a point of zero pressure differential up to and slightly beyond the pressure differential encountered at the optimum density of the liquid. Thus, a great portion of the needle travel over the face of the gauge would be taken up by merely reaching the point of optimum density of the liquid, thereby leaving only a small needle travel available for reflecting the variances in the density of the liquid.

The zero suppressor of FIG. 1 is effective to eliminate the preliminary needle travel formerly necessary. As air under pressure from air supply 11 passes from its delivery conduit 16 to conduit 18, the flow of air divides, a portion thereof traveling down tube 19 and bubbling up through the liquid, and the remaining portion traveling into the hermetically sealed housing 21 of differential pressure apparatus 14. Since the air traveling down tube 19 must force the liquid out of the tube prior to reaching the bottom of the tube and bubbling through the liquid, considerable pressure is built up in tube 19 and conduits 16 and 18. Differential pressure gauge 22 is exposed to the air under pressure by means of extension 20, and opening 24 allows the air to flow into housing 21. From housing 21, the air flows through conduit 25 and its branch conduits 31 and 32 into first and second chambers 29 and 30 of zero suppressor 15. The air flowing through branch conduit 31 into first chamber 29 is effective to flex diaphragm 28 to the right (FIG. 1), against the bias of tension spring 40. Flexing of diaphragm 28 to the right pivots lever 41 about its fulcrum 42 so that valve disc 44 is removed from the opening of branch conduit 32, whereupon air flows into second chamber 30. The air flows out of second chamber 30 through conduit 46 and downwardly through tube 45 into the liquid, where it is allowed to bubble up through the liquid.

When tubes 19 and 45 are first inserted into the liquid and the air under pressure from air supply 11 begins to communicate with the elements of the apparatus, the pressure of air in first chamber 29 of zero suppressor 15 must build up to overcome the tension of spring 40 before valve disc 44 is moved away from the opening of branch conduit 32 to allow the air to flow through tube 45. This preliminary pressure buildup in zero suppressor 15 is effective to create a condition similar to that where the ends of tubes 19 and 45 are closer to each other than they actually are; that is, zero suppressor 15 functions to effectively shorten the distance between the ends of tubes 19 and 45, as would be desirable when measuring the density of a high density liquid.

When the density of a relatively high density liquid is to be measured, adjusting knob 39 is rotated to move adjusting disc 36 away from diaphragm 28 to create a higher tension in spring 40. Thus, a higher air pressure in first chamber 29 must be present to overcome the tension of spring 40 to urge flexible diaphragm 28 to the right (FIG. 1) and allow the air from conduit 25 to flow through second chamber 30 to tube 45. This increased pressure requirement of first chamber 29 is similar to thrusting tube 45 deeper into the liquid and shortening the distance between the ends of tubes 45 and 19. With the use of zero suppressor 15, when air from air supply 11 attempts to travel in a downward direction through tube 19 into a dense liquid, the density of the liquid will create a resistance to the flow of air through tube 19. In the meantime, the air traveling into zero suppressor 15 will have to build up to almost a corresponding resistance before flexible diaphragm 28 will move its valve disc 44 away from the opening of branch conduit 32, to permit the flow of air down through tube 45.

In order the calibrate the setting of zero suppressor 15, tubes 19 and 45 can be inserted into a tank of water, or another liquid of which the density is known, and adjusting knob 39 adjusted until differential pressure gauge 22 shows a desirable setting. Tubes 19 and 45 can then be inserted into the liquid of which density measurements are required.

If it were desired to measure and record the density of a liquid where the weight of the liquid is expected to range from 8 to 12 pounds per gallon, tubes 19 and 49 could be inserted into a tank of water and adjusting knob 39 of zero suppressor 15 adjusted so that the proper needle setting occurs on differential pressure gauge 22. Since the range in the weight of liquid is expected to be between 8 and 12 pounds per gallon, or only a range of 4 pounds per gallon, zero suppressor 15 can be adjusted so that the needle indicator of differential pressure gauge 22 is set at zero when the weight of the liquid is actually 8 pounds per gallon. Thus, the entire face of the gauge can be utilized to show a difference in liquid weight of 4 pounds per gallon. This effectively triples the scale of differential pressure gauge 22, thus providing a more accurate determination of the varying density of the liquid.

If the density of the liquid is known prior to its recording on the liquid density measuring apparatus, tubes 19 and 45 can be inserted into the liquid and zero suppressor 15 adjusted until the proper reading occurs on the face of differential pressure gauge 22. Afterwards, any change in the density of the liquid will be reflected on the face of the gauge. If the density of the liquid is unknown, zero suppressor 15 can be adjusted so as to place a high tension on spring 40 and tubes 19 and 45 inserted into the liquid. As the air pressure builds up in the apparatus, no flow of air will occur in tube 45, due to the excessive tension of spring 40. Because of the no-flow state of tube 45, the pressure in housing 21 of differential pressure apparatus 14 and inside differential pressure gauge 22 will be identical, and differential pressure gauge 22 will not reflect any pressure differential. Zero suppressor 15 can then be adjusted to relax spring 40 until the pressure in first chamber 29 is effective to move flexible diaphragm 28 to the right (FIG. 1) and air is permitted to flow through branch conduit 32 into second chamber 30. When the air flows through the opening of tube 45, a pressure differential will occur between extension 20 of conduit 18 and housing 21 of differential pressure apparatus 14, and the corresponding indication will appear on the face of differential pressure gauge 22.

While the manometer equation previously was modified in accordance with a double bubble density measuring apparatus without a zero suppressor, the inclusion of a zero suppressor requires a modification to the formula to account for the constant pressure ($P_c$) of the zero suppressor. Thus:

$$\Delta P = P_1 - P_2 - P_c$$
$$\Delta P = \rho_g L_1 - \rho_g L_2 - P_c$$
$$\Delta L = L_1 - L_2$$
$$\Delta P = \rho(g\Delta L) - P_c$$
$$\frac{\Delta P}{g\Delta L} = \rho - \frac{P_c}{g\Delta L}$$
$$\rho_{gauge} = \Delta P / g\Delta L \quad \text{(gauge indication)}$$
$$\rho_c = P_c / g\Delta L \quad \text{(zero suppressor)}$$
$$\rho_{gauge} = \rho - \rho_c$$

where $\rho_g$ equals density read on differential pressure gauge and $\rho_c$ equals constant density set into zero suppressor. Thus, $\rho_g$ is a small value in comparison to $\rho$ since $\rho_c$ is subtracted from $\rho$ to determine the value of $\rho_g$.

In practical application, tubes 19 and 45 can be located at a remote point from the remaining elements of the apparatus. As is shown in FIG. 2, an alarm and secondary recording apparatus can be combined with the system. Inasmuch as only a very small amount of air flow is required to operate the alarm and secondary recording apparatus, these elements can be located large distances from the remaining elements of the apparatus.

At this point, it should be understood that the zero suppressor enables a single liquid density measuring apparatus to be utilized with both heavy and light liquids, and the differential pressure gauge is effective to give an accurate reading for both heavy and light liquids.

It will be obvious to those skilled in the art that many variations may be made in the embodiments chosen for the purpose of illustrating the present invention without departing from the scope thereof as defined by the appended claims.

What is claimed as invention is:

1. Apparatus for determining the density of a liquid comprising:
   a source of pressurized gas,
   first gas injecting means communicating with the source of pressurized gas for flowing gas into the liquid at a first level,
   second gas injecting means communicating with the source of pressurized gas for flowing gas into the liquid at a level a constant distance above the first level, comparing means communicating with said first and second gas injecting means for comparing the pressure of the gas flowing through said first gas injecting means with the pressure of the gas flowing through said second gas injecting means, and means for increasing the pressure required to flow gas through said second gas injecting means, said means for increasing the pressure required to flow gas through said second gas injection means comprising a housing defining a first chamber and a second chamber hermetically divided from each other by a movable member, means for communicating said first and second chambers with said comparing means and said source of pressurized gas, adjustable biasing means for urging said movable member toward said first chamber, valve means responsive to the movement of said movable member toward said first chamber for blocking communication between said second chamber and said comparing means, and means for communicating said second chamber with said second gas injecting means.

2. The invention of claim 1 wherein said pressure comparing means comprises a differential pressure gauge communicating with said first gas injecting means and the first and second chambers of said housing.

3. Apparatus for measuring the density of a liquid comprising:

first injecting means for flowing gas into the liquid to a first depth, second injecting means for flowing gas into the liquid to a second depth shallower than the first depth, choking means for partially blocking the flow of gas to the second depth, and means communicating with said first injecting means and said choking means for comparing the pressure of the partially blocked gas with the pressure of the gas in said first injecting means, said first injecting means and said second injecting means being constructed to flow gas into the liquid at a constant vertical distance apart, and said choking means being variably resiliently urged toward its closed position to block the flow of gas from said second injecting means into the liquid.

References Cited

UNITED STATES PATENTS 2,577,548  12/1951  Vetter _____ 73—439

FOREIGN PATENTS 1,241,058  11/1959  France.

RICHARD C. QUEISSER, Primary Examiner
JOHN K. LUNSFORD, Assistant Examiner

U.S. Cl. X.R.
137—489, 503